United States Patent [19]

Okitsu et al.

[11] Patent Number: 5,208,090
[45] Date of Patent: May 4, 1993

[54] METAL SINGLE FIBER-REINFORCED PREPREG

[75] Inventors: Masatoyo Okitsu, Kasukabe; Tsuneo Akatsuka, Saitama, both of Japan

[73] Assignee: Somar Corporation, Japan

[21] Appl. No.: 649,917

[22] Filed: Feb. 4, 1991

[30] Foreign Application Priority Data

Feb. 9, 1990 [JP] Japan .................. 2-31030

[51] Int. Cl.$^5$ .................. B32B 5/12; B32B 9/00; B32B 5/06; D04H 3/12
[52] U.S. Cl. .................. 428/113; 428/114; 428/284; 428/285; 428/286; 428/287; 428/288; 428/292; 428/294; 428/297; 428/298; 428/303; 428/366; 428/408; 428/902
[58] Field of Search .............. 428/294, 366, 113, 297, 428/298, 303, 36.2, 36.3, 408, 114, 284, 285, 286, 287, 288, 292, 902

[56] References Cited

U.S. PATENT DOCUMENTS

| | | | |
|---|---|---|---|
| 3,565,741 | 2/1971 | Jaray | 428/294 |
| 4,119,748 | 10/1978 | Verbauwhede et al. | 428/113 |
| 4,135,035 | 1/1979 | Branen et al. | 428/366 |
| 4,943,472 | 7/1990 | Dyksterhouse et al. | 428/408 |

Primary Examiner—George F. Lesmes
Assistant Examiner—James D. Withers
Attorney, Agent, or Firm—Lorusso & Loud

[57] ABSTRACT

A composite material is disclosed which includes a sheet of a prepreg including a multitude of substantially uniaxially oriented filaments having a diameter of 3–16 μm and impregnated with a thermosetting resin, and a multiplicity of metal single fibers having a diameter of 50–300 μm and bonded to at least one surface of the sheet with the thermosetting resin, the single fibers being spaced apart from each other with a predetermined space and arranged substantially in parallel with the filaments.

4 Claims, 1 Drawing Sheet

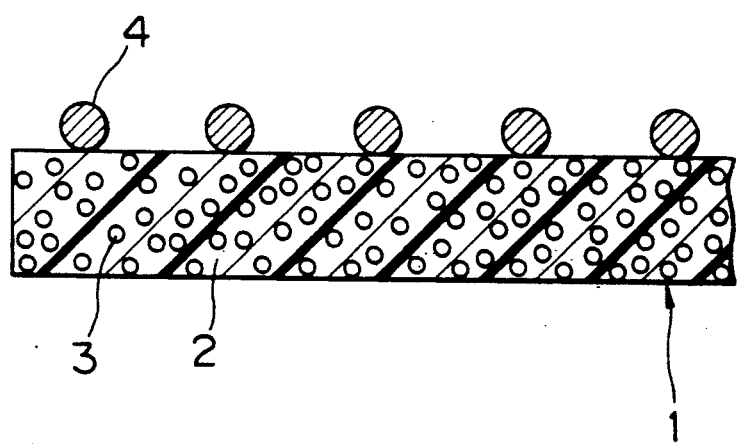

METAL SINGLE FIBER-REINFORCED PREPREG

BACKGROUND OF THE INVENTION

This invention relates to a metal single fiber-reinforced prepreg having substantially uniaxially oriented filaments dispersed in a thermosetting resin matrix.

A sheet-like prepreg is known which includes a multitude of uniaxially oriented, organic or inorganic filaments, such as of carbon fibers, glass fibers or aromatic polyamide fibers, impregnated with a thermosetting resin. Such a prepreg gives light weight composite articles having high bending strength and modulus and, thus, is utilized as raw materials for golf club shafts, fishing rods and the like molded articles.

There is still a strong demand for improved molded articles with higher mechanical properties. To comply with this demand, it is necessary to use a specific material other than the above-described fibers. Boron fibers are known to have high bending strength and modulus and are considered to be utilizable for prepregs of the above-mentioned type. However, boron fibers are single fibers having relatively a large diameter of 100–200 $\mu$m and, therefore, are not suited for use as fibers for prepregs. In particular, a prepreg having boron fibers impregnated with a thermosetting resin is readily disintegrated along the axis.

To cope with this problem, a prepreg is proposed in which glass fibers are used as weft and boron fibers as warp. Also proposed is a laminate of a boron fiber prepreg with a prepreg of a glass fiber fabric (glass slim cloth). In either case, improvement in mechanical properties per unit weight of the prepreg is not satisfactory since the glass fibers oriented in the direction perpendicular to that of the boron fibers do not contribute to the improvement. In addition, these prepregs are not easily produced.

SUMMARY OF THE INVENTION

It is, therefore, an object of the present invention to provide a prepreg suitable for forming molded articles having improved mechanical properties.

Another object of the present invention is to provide a prepreg affording molding articles with desired, controlled mechanical properties according to the end use thereof.

In accordance with the present invention, there is provided a composite material which includes a sheet of a prepreg including a multitude of substantially uniaxially oriented filaments having a diameter of 3–16 $\mu$m and impregnated with a thermosetting resin, and a multiplicity of metal single fibers having a diameter of 50–300 $\mu$m and bonded to at least one surface of the sheet with the thermosetting resin serving as an adhesive, the single fibers being spaced apart from each other with a predetermined space and arranged substantially in parallel with the filaments.

The prepreg according to the present invention is reinforced by metal single fibers. Since the metal single fibers are oriented in the same direction as that of the filaments forming the substrate sheet, the bending strength and modulus per unit weight of the composite material are higher than the conventional prepregs. Further, by varying the kind of the metal single fibers or, more importantly, by varying the space between the single metal fibers, the mechanical properties of the molded articles obtained therefrom may be controlled at will.

BRIEF DESCRIPTION OF THE DRAWING

Other objects, features and advantages of the present invention will become apparent from the detailed description of the preferred embodiments of the invention to follow, when considered in light of the accompanying drawing, in which the sole FIGURE is a cross-sectional view schematically illustrating the composite material according to the present invention.

DETAILED DESCRIPTION OF THE PREFERRED EMBODIMENTS OF THE INVENTION

The sole FIGURE schematically depicts one embodiment of a composite material according to the present invention. Designated generally as 1 is a sheet of a prepreg composed of a large number of unidirectionally oriented filaments 3 dispersed in a matrix 2 of a thermosetting resin. Provided on one surface of the sheet 1 are a multiplicity of parallel, spaced apart, metal single fibers 4 bonded to the sheet with the thermosetting resin serving as an adhesive and oriented in the same direction as the filaments 3.

The prepreg sheet 1 may be prepared by any known method. For example, a plurality of tows or bundles each composed of a multiplicity of filaments are first dipped in a solution containing a thermosetting resin to impregnate the bundles with the solution. After drying, the resulting bundles are arranged in parallel with each other between a pair of peelable papers. This is then passed through a pair of rollers to press the bundles, thereby to obtain the desired prepreg sheet sandwiched between the peelable papers. Alternatively, a plurality of the similar bundles are arranged in parallel with each other between a pair of thermosetting resin films. This is then sandwiched between a pair of peelable papers and the resulting laminate is passed through a heated rollers to press the bundles and melt the resin films so that the pressed bundles are impregnated with the melted resin, thereby to obtain the desired prepreg sheet sandwiched between the peelable papers. In use, one or both of the peelable papers are removed.

The thickness of the prepreg sheet 1 is generally 0.03–0.4 mm. The thickness may be controlled by controlling the diameter of the fiber bundles and the space with which the bundles are arranged in parallel prior to pressing.

The bundle of filaments may be, for example, carbon fibers, glass fibers, aromatic polyamide fibers (Kevlar fibers) and ceramic fibers. Illustrative of ceramic fibers are alumina fibers, silicon carbide fibers, silicon nitride fibers and Si—Ti—C—O fibers. The filaments constituting the bundle should have a diameter of 3–16 $\mu$m, preferably 5–13 $\mu$m. The bundle generally has a diameter of 100–500 $\mu$m, preferably 200–400 $\mu$m, a tensile modulus of 7,000–35,000 kgf/mm$^2$, preferably 10,000–30,000 kgf/mm$^2$ and a tensile strength of at least 200 kgf/mm$^2$.

Any thermosetting resin may be used for the formation of the prepreg sheet as long as it may be thermally hardened during molding step for the formation of molded articles. Illustrative of suitable thermosetting resins are epoxy resins, unsaturated polyester resins, phenol resins and urethane resins.

The metal single fibers to be bonded to the prepreg sheet may be, for example, steel fibers, titanium fibers, amorphous metal fibers or boron fibers. Above all, the boron fibers are particularly preferably used. The boron fiber is a composite fiber composed of a core, such as tungsten core or carbon core, and a boron layer surrounding the core. The amorphous metal fiber may be formed, for example, of a Co—Fe—Cr—Si—B system, Fe—Si—B system or a Co—Si—B system.

The composite material according to the present invention may be prepared by arranging the metal single fibers 4 on one or both surfaces of the prepreg sheet 1 in parallel with the filaments 3 of the sheet 1 with a predetermined space and pressing the fibers 4 against the sheet 1, if necessary, with heating. By this, the fibers 4 are bonded to the sheet 1 with the thermosetting resin 2 serving as an adhesive. A protecting film, generally a peelable paper, is desirably provided on the the fiber-bearing surface to preventing blocking during storage and transportation. In this case, the pressing or heat-pressing may be performed after providing the protecting film.

The space between the adjacent metal single fibers 4 varies according to the end use of the composite material. The narrower the space, the greater become the mechanical strengths of molded articles obtained from the composite material. The space is generally in the range of 0.05 mm to 10 mm.

For providing sufficient bonding between the metal fibers 4 and the prepreg sheet 1, the amount of the thermosetting resin of the prepreg sheet 1 is suitably adjusted to 60-300 parts by weight, more preferably 80-200 parts by weight, per 100 parts by weight of the total of the filaments and the metal single fibers.

The following examples will further illustrate the present invention.

EXAMPLE 1

50 Bundles of carbon fibers having a filament number of 12,000 and a modulus of 24 ton/mm$^2$ (HTA-7-12000, manufactured by Toho Rayon Inc.) were impregnated with a solvent solution of an epoxy resin composition and dried. These bundles were arranged in parallel with each other between a pair of peelable papers. The space between each adjacent two bundles was 5.4 mm. The sandwiched bundles were then passed through a nip between pressure rollers to obtain a prepreg sheet having a width of about 270 mm and a resin content of 55% by weight. One of the peelable papers was removed and 2700 boron fibers (manufactured by AVCO Inc.) with a diameter of 100 μm were placed in parallel with each other in the same direction as the filaments of the prepreg sheet. The distance between each adjacent two boron fibers was 0.1 mm. A peelable paper was placed to cover the boron fiber-bearing surface and the laminate was passed through a pair of pressure rolls to obtain a composite material having a resin content of 34% by weight, a carbon fiber content of 148 g/m$^2$ and a boron fiber content of 210 g/m$^2$. The composite material was cut, superimposed on each other and molded at a temperature of 130° C. a pressure of 10 kg/cm$^2$ to obtain a composite plate with a thickness of 3 mm and a fiber content (total content of boron fibers and carbon fibers) of 60% based on the volume of the composite plate. The bending strength and modulus of the plate were measured in accordance with JIS K-7074 to give the results shown in Table 1.

EXAMPLE 2

50 Bundles of carbon fibers having a filament number of 12,000 and a modulus of 24 ton/mm$^2$ (HTA-7-12000, manufactured by Toho Rayon Inc.) were impregnated with a solvent solution of an epoxy resin composition and dried. These bundles were arranged in parallel with each other between a pair of peelable papers. The space between each adjacent two bundles was 5.4 mm. The sandwiched bundles were then passed through a nip between pressure rollers to obtain a prepreg sheet having a width of about 270 mm and a resin content of 41% by weight. One of the peelable papers was removed and 675 boron fibers (manufactured by AVCO Inc.) with a diameter of 100 μm were placed in parallel with each other in the same direction as the filaments of the prepreg sheet. The distance between each adjacent two boron fibers was 0.4 mm. A peelable paper was placed to cover the boron fiber-bearing surface and the laminate was passed through a pair of pressure rolls to obtain a composite material having a resin content of 34% by weight, a carbon fiber content of 148 g/m$^2$ and a boron fiber content of 53 g/m$^2$. The composite material was cut, superimposed on each other and molded at a temperature of 130° C. a pressure of 10 kg/cm$^2$ to obtain a composite plate with a thickness of 3 mm and a fiber content of 60% based on the volume of the composite plate. The bending strength and modulus of the plate were measured in accordance with JIS K-7074 to give the results shown in Table 1.

EXAMPLE 3

50 Bundles of carbon fibers having a filament number of 12,000 and a modulus of 24 ton/mm$^2$ (HTA-7-12000, manufactured by Toho Rayon Inc.) were impregnated with a solvent solution of an epoxy resin composition and dried. These bundles were arranged in parallel with each other between a pair of peelable papers. The space between each adjacent two bundles was 5.4 mm. The sandwiched bundles were then passed through a nip between pressure rollers to obtain a prepreg sheet having a width of about 270 mm and a resin content of 35% by weight. One of the peelable papers was removed and 100 boron fibers (manufactured by AVCO Inc.) with a diameter of 100 μm were placed in parallel with each other in the same direction as the filaments of the prepreg sheet. The distance between each adjacent two boron fibers was 2.7 mm. A peelable paper was placed to cover the boron fiber-bearing surface and the laminate was passed through a pair of pressure rolls to obtain a composite material having a resin content of 34% by weight, a carbon fiber content of 148 g/m$^2$ and a boron fiber content of 8 g/m$^2$. The composite material was cut, superimposed on each other and molded at a temperature of 130° C. a pressure of 10 kg/cm$^2$ to obtain a composite plate with a thickness of 3 mm and a fiber content of 60% based on the volume of the composite plate. The bending strength and modulus of the plate were measured in accordance with JIS K-7074 to give the results shown in Table 1.

COMPARATIVE EXAMPLE 1

Boron fibers as used in Example 1 were impregnated with an epoxy resin solution as used in Example 1 and dried. The resulting fibers were placed on one surface of a glass slim cloth with a weight of 25 g/m$^2$ and pressure bonded thereto. The fibers were arranged in parallel with each other with a space of 0.1 mm. The thus obtained laminate had a resin content of 34% by weight and a boron fiber content of 210 g/m². This laminate was then bonded to a carbon fiber prepreg to obtain a composite material having a resin content of 34% by weight, a carbon fiber content of 148 g/m² and a boron fiber content of 210 g/m². The carbon fiber prepreg used was prepared in the same manner as that in Example 1. The composite material was cut, superimposed on each other and molded at a temperature of 130° C. a pressure of 10 kg/cm² to obtain a composite plate with a thickness of 3 mm and a fiber content of 60% based on the volume of the composite plate. The bending strength and modulus of the plate were measured in accordance with JIS K-7074 to give the results shown in Table 1.

COMPARATIVE EXAMPLE 2

Comparative Example 1 was repeated in the same manner as described except that the distance between each adjacent two boron fibers was increased to 0.4 mm. It was not possible to uniformly arrange the boron fibers on the glass slim cloth.

COMPARATIVE EXAMPLE 3

A cord fabric was prepared using boron fibers as used in Example 1 as warp and glass fibers with a yarn number of 450 as weft. The distance between each adjacent two boron fibers was 0.4 mm while that between two glass fibers was 50 mm. This fabric was then laminated with a carbon fiber prepreg obtained in the same manner as that in Example 2 to obtain a composite material having a resin content of 34% by weight, a carbon fiber content of 148 g/m² and a boron fiber content of 53 g/m². The composite material was cut, superimposed on each other and molded at a temperature of 130° C, a pressure of 10 kg/cm² to obtain a composite plate with a thickness of 3 mm and a fiber content of 60% based on the volume of the composite plate. The bending strength and modulus of the plate were measured in accordance with JIS K-7074 to give the results shown in Table 1.

COMPARATIVE EXAMPLE 4

A cord fabric was prepared using boron fibers as used in Example 1 as warp and glass fibers with a yarn number of 450 as weft. The distance between each adjacent two boron fibers was 2.7 mm while that between two glass fibers was 50 mm. This fabric was then laminated with a carbon fiber prepreg obtained in the same manner as that in Example 3 to obtain a composite material having a resin content of 34% by weight, a carbon fiber content of 148 g/m² and a boron fiber content of 8 g/m². The composite material was cut, superimposed on each other and molded at a temperature of 130° C. a pressure of 10 kg/cm² to obtain a composite plate with a thickness of 3 mm and a fiber content of 60% based on the volume of the composite plate. The bending strength and modulus of the plate were measured in accordance with JIS K-7074 to give the results shown in Table 1.

TABLE 1

| | Fiber Content (vol. %) | Boron Fiber Content (g/m²) | Weight of Plate (kg/m²) | Bending Strength (kg/mm²) | Bending Modulus (ton/mm²) |
| --- | --- | --- | --- | --- | --- |
| Example 1 | 60 | 210 | 5.4 | 160 | 14.5 |
| Example 2 | 60 | 53 | 5.0 | 168 | 13.5 |
| Example 3 | 60 | 8 | 4.0 | 178 | 12.5 |
| Comp. Ex. 1 | 60 | 210 | 5.5 | 155 | 14.0 |
| Comp. Ex. 3 | 60 | 53 | 5.0 | 163 | 13.5 |
| Comp. Ex. 4 | 60 | 8 | 4.0 | 171 | 12.5 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A composite material comprising a planar sheet of a prepreg including a multitude of substantially uniaxially oriented filaments selected from the group consisting of carbon, ceramic and aromatic polyamide filaments, said filaments having a diameter of 3–16 μm and impregnated with a thermosetting resin, and a multiplicity of metal single fibers having a diameter of 50–300 μm and bonded to at least one surface of said sheet by said thermosetting resin with only a portion of the circumference of each of said single fibers being embedded in said sheet, said single fibers being spaced apart from each other and arranged substantially in parallel with said filaments.

2. A composite material according to claim 1, wherein said thermosetting resin is selected from the group consisting of epoxy resins, unsaturated polyester resins, phenol resins and urethane resins.

3. A composite material according to claim 1, wherein said metal single fibers are selected from the group consisting of steel fibers, titanium fibers, amorphous metal fibers and boron fibers.

4. A composite material according to claim 1, wherein the amount of said thermosetting resin is 60–300 parts by weight per 100 parts by weight of the total of said filaments and said metal single fibers.

* * * * *